US010743231B2

(12) United States Patent
Dong et al.

(10) Patent No.: US 10,743,231 B2
(45) Date of Patent: Aug. 11, 2020

(54) METHOD AND DEVICE FOR ENHANCING SERVICE IN COMMUNICATION SYSTEM SUPPORTING PUBLIC SAFETY NETWORK SERVICE

(71) Applicant: Samsung Electronics Co., Ltd., Suwon-si, Gyeonggi-do (KR)

(72) Inventors: Jeongsik Dong, Yongin-si (KR); Junhyuk Song, Anyang-si (KR); Daejoong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/773,023

(22) PCT Filed: Nov. 4, 2016

(86) PCT No.: PCT/KR2016/012656
§ 371 (c)(1),
(2) Date: May 2, 2018

(87) PCT Pub. No.: WO2017/078460
PCT Pub. Date: May 11, 2017

(65) Prior Publication Data
US 2018/0324667 A1 Nov. 8, 2018

(30) Foreign Application Priority Data
Nov. 6, 2015 (KR) .................. 10-2015-0155818

(51) Int. Cl.
*H04W 36/30* (2009.01)
*H04W 36/32* (2009.01)
(Continued)

(52) U.S. Cl.
CPC ............. *H04W 36/30* (2013.01); *H04W 4/06* (2013.01); *H04W 4/10* (2013.01); *H04W 4/90* (2018.02);
(Continued)

(58) Field of Classification Search
CPC ..... H04W 36/30; H04W 36/00; H04W 36/32; H04W 4/90; H04W 4/06; H04W 4/10;
(Continued)

(56) References Cited

U.S. PATENT DOCUMENTS

2005/0111393 A1    5/2005  Jeong et al.
2007/0070972 A1    3/2007  Wang et al.
(Continued)

FOREIGN PATENT DOCUMENTS

CN         104284392 A    1/2015
KR    10-2014-0080279 A   6/2014
(Continued)

OTHER PUBLICATIONS

European Search Report dated Jan. 21, 2019 issued in European Patent Application No. 16862476.5.
(Continued)

*Primary Examiner* — Ian N Moore
*Assistant Examiner* — Brian T Le
(74) *Attorney, Agent, or Firm* — Jefferson IP Law, LLP

(57) ABSTRACT

An embodiment of the present invention relates to a method for transmitting, by a base station, information in a wireless communication system, and a base station performing the same, the method comprising the steps of: generating a system information block comprising first hysteresis information about a first type terminal, and second hysteresis information about a second type terminal; and broadcasting the generated system information block, wherein the first type terminal includes a terminal which does not provide a
(Continued)

public safety network service, and wherein the second type terminal includes a terminal which provides a public safety network service. In addition, the present invention relates to a terminal which operates with the base station, and a method for operating the terminal.

13 Claims, 13 Drawing Sheets

(51) Int. Cl.
| | |
|---|---|
| *H04W 48/10* | (2009.01) |
| *H04W 88/02* | (2009.01) |
| *H04W 88/08* | (2009.01) |
| *H04W 4/90* | (2018.01) |
| *H04W 36/00* | (2009.01) |
| *H04W 4/06* | (2009.01) |
| *H04W 4/10* | (2009.01) |
| *H04W 48/20* | (2009.01) |

(52) U.S. Cl.
CPC ........... *H04W 36/00* (2013.01); *H04W 36/32* (2013.01); *H04W 48/10* (2013.01); *H04W 48/20* (2013.01); *H04W 88/02* (2013.01); *H04W 88/08* (2013.01)

(58) Field of Classification Search
CPC ..... H04W 48/10; H04W 48/20; H04W 88/02; H04W 88/08
See application file for complete search history.

(56) References Cited

U.S. PATENT DOCUMENTS

| | | |
|---|---|---|
| 2007/0249282 A1 | 10/2007 | Shaheen |
| 2007/0264992 A1 | 11/2007 | Maenpaa |
| 2008/0049682 A1 | 2/2008 | Ding et al. |
| 2008/0267109 A1 | 10/2008 | Wang et al. |
| 2011/0230220 A1 | 9/2011 | Chen |
| 2012/0003972 A1 | 1/2012 | Boixadera et al. |
| 2012/0155364 A1 | 6/2012 | Kim et al. |
| 2012/0236776 A1 | 9/2012 | Zhang et al. |
| 2013/0039250 A1 | 2/2013 | Hsu |
| 2013/0183973 A1 | 7/2013 | Amerga et al. |
| 2013/0229974 A1 | 9/2013 | Xu et al. |
| 2013/0301509 A1 | 11/2013 | Purnadi et al. |
| 2013/0336173 A1 | 12/2013 | Mandil et al. |
| 2014/0036676 A1 | 2/2014 | Purnadi et al. |
| 2014/0185455 A1 | 7/2014 | Balasubramanian et al. |
| 2014/0247717 A1 | 9/2014 | Jamadagni et al. |
| 2014/0286222 A1 | 9/2014 | Yu et al. |
| 2014/0293859 A1 | 10/2014 | Liang et al. |
| 2015/0171977 A1 | 6/2015 | Kashiwagi |
| 2015/0172977 A1 | 6/2015 | Koc et al. |
| 2015/0201392 A1 | 7/2015 | Sartori et al. |
| 2015/0215757 A1 | 7/2015 | Miskiewicz et al. |
| 2015/0327141 A1 | 11/2015 | Jung et al. |
| 2016/0212607 A1 | 7/2016 | Trichias et al. |

FOREIGN PATENT DOCUMENTS

| | | |
|---|---|---|
| WO | 2012/125976 A2 | 9/2012 |
| WO | 2012/136023 A1 | 10/2012 |
| WO | 2012/155476 A1 | 11/2012 |
| WO | 2012/167661 A1 | 12/2012 |
| WO | 2013/023558 A1 | 2/2013 |
| WO | 2013/051871 A1 | 4/2013 |
| WO | 2013/131306 A1 | 9/2013 |
| WO | 2013/173323 A1 | 11/2013 |
| WO | 2014/073940 A1 | 5/2014 |
| WO | 2014/105444 A1 | 7/2014 |
| WO | 2015/003613 A1 | 1/2015 |
| WO | 2015/044367 A1 | 4/2015 |
| WO | 2015/137732 A1 | 9/2015 |
| WO | 2015/142090 A1 | 9/2015 |

OTHER PUBLICATIONS

Ericsson; Cell selection and reselection for Prose Direct Communication; 3GPP TSG RAN WG2 #89; TDoc R2-150063; Jan. 12, 2015; Athens, Greece.

Ericsson: "Differentiation between PS discovery and non-PS discovery", R2-153592; 3rd Generation Partnership Project (3GPP) TSG-RAN WG2 #91, Mobile Competence Centre; 650, Route Des Lucioles; F-06921 Sophia-Antipo, Beijing, P.R. China; XP050993903; Aug. 14, 2015.

European Search Report dated Oct. 16, 2018; App No. 16862476. 5-1214; PCT/KR2016012656.

Chinese Office Action dated Jun. 4, 2020, issued in Chinese Application No. 201680063557.7.

METHOD AND DEVICE FOR ENHANCING SERVICE IN COMMUNICATION SYSTEM SUPPORTING PUBLIC SAFETY NETWORK SERVICE

TECHNICAL FIELD

The present invention relates to a method and apparatus for enhancing services in a communication system supporting public safety network services. The present invention also relates to a method and apparatus for enhancing services when a public safety long term evolution (PS-LTE) terminal in the idle mode is moved between cells.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd generation partnership project (3GPP) has been working to standardize specifications for the long term evolution (LTE) system as a next generation mobile communication system. The LTE system aims to realize high-speed packet based communication supporting a data rate of about 100 Mbps. To this end, various approaches have been considered, such as reducing the number of nodes on a communication path through simplification of the network architecture and bringing wireless protocols as close as possible to wireless channels.

Meanwhile, in the data service, unlike the voice service, resources to be allocated are determined according to the amount of data to be transmitted and the channel conditions. Hence, in a wireless communication system such as a mobile communication system, the scheduler manages allocation of transmission resources in consideration of the amount of available resources, the channel conditions, and the amount of data to be transmitted. This is also applied to the LTE system, which is one of the next generation mobile communication systems, and the scheduler located at the base station manages and allocates radio transmission resources.

With the development of broadband wireless transmission technology and terminals supporting various functions, there is a demand for a variety of services. In particular, Multimedia Broadcast Multicast Services (MBMS) is a technology that can provide a mobile broadcast service through a cellular mobile communication network. Recently, discussions have been made to provide LTE-based public safety services using evolved MBMS (eMBMS) technology (hereinafter, eMBMS and MBMS may be used interchangeably).

Unlike a point-to-point transmission service, the MBMS service is a point-to-multipoint transmission service that enables the base station to transmit the same packet to multiple terminals in one cell, thereby increasing the efficiency of utilization of radio resources. In addition, the LTE-based MBMS service employs a multi-cell transmission scheme enabling multiple base stations to simultaneously transmit the same packet. Using such a multi-cell transmission scheme, the terminal receiving the MBMS service may obtain a diversity gain at the physical layer, increasing the transmission efficiency.

DISCLOSURE OF INVENTION

Technical Problem

Accordingly, an aspect of the present invention is to provide a method and apparatus for enhancing services in a communication system supporting public safety network services. Another aspect of the present invention is to provide a method and apparatus for enhancing services when a PS-LTE terminal in the idle mode is moved between cells (cell change).

Solution to Problem

In accordance with an aspect of the present invention, there is provided a method of information transmission for a base station in a wireless communication system. The method may include: generating a system information block including first hysteresis information for a first type terminal and second hysteresis information for a second type terminal; and broadcasting the generated system information block, wherein the first type terminal includes a terminal not supporting the public safety network service, and the second type terminal includes a terminal supporting the public safety network service.

In accordance with another aspect of the present invention, there is provided a base station in a wireless communication system. The base station may include: a transceiver unit configured to transmit and receive a signal; and a controller configured to control generating a system information block including first hysteresis information for a first type terminal and second hysteresis information for a second type terminal, and broadcasting the generated system information block, wherein the first type terminal includes a terminal not supporting the public safety network service, and the second type terminal includes a terminal supporting the public safety network service.

In accordance with another aspect of the present invention, there is provided a method of performing cell reselection for a terminal in a wireless communication system. The method may include: receiving a system information block including at least one of hysteresis information and cell reselection threshold information from a base station; determining at least one piece of information to be applied according to the type of the terminal among the hysteresis information and the cell reselection threshold information; and performing cell reselection based on the system information block and the determination result, wherein the terminal type includes a first type for a terminal not supporting the public safety network service and a second type for a terminal supporting the public safety network service.

In accordance with another aspect of the present invention, there is provided a terminal in a wireless communication system. The terminal may include: a transceiver unit configured to transmit and receive a signal; and a controller configured to control receiving a system information block including at least one of hysteresis information and cell reselection threshold information from a base station, determining at least one piece of information to be applied according to the type of the terminal among the hysteresis information and the cell reselection threshold information, and performing cell reselection based on the system information block and the determination result, wherein the terminal type includes a first type for a terminal not supporting the public safety network service and a second type for a terminal supporting the public safety network service.

Aspects or objects of the present invention are not limited to those described above. Other aspects and salient features of the present invention will become apparent to those skilled in the art from the following detailed description.

Advantageous Effects of Invention

In a feature of the present invention, it is possible to provide a method and apparatus for enhancing services in a communication system supporting public safety network services. It is also possible to provide a method and apparatus for enhancing services when a PS-LTE terminal in the idle mode is moved between cells (cell change).

In another feature of the present invention, it is possible to reduce the buffering phenomenon that may occur according to the reception timing of the eMBMS service information when the terminal in the idle mode is moved between cells.

MODE FOR THE INVENTION

Figure 1:
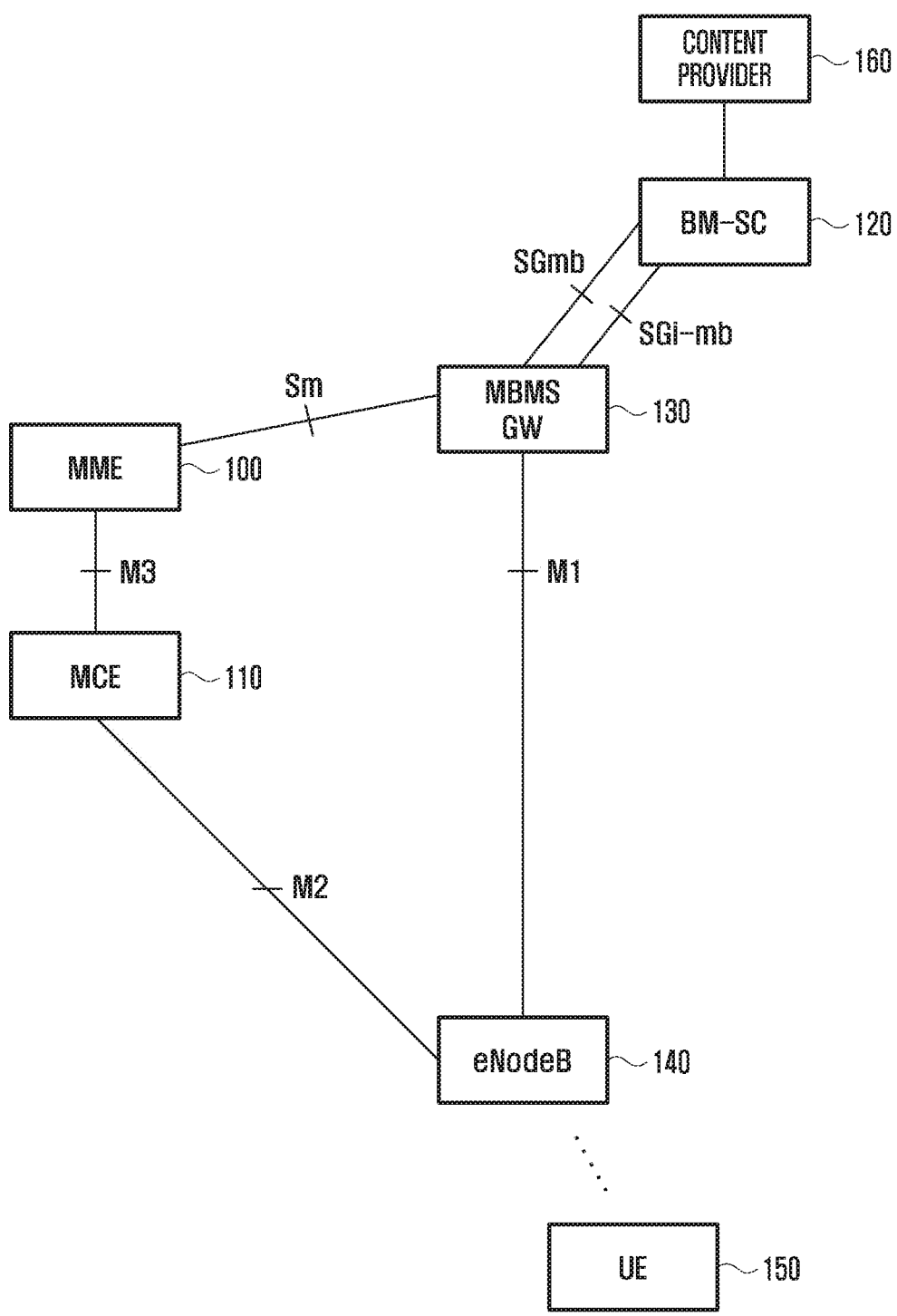
FIG. 1 illustrates the network architecture of the LTE system for the MBMS service.

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification and the claims should be construed in accordance with the spirit of the invention.

The following description of embodiments of the present invention is focused on OFDM-based wireless communication systems and the 3GPP E-UTRAN standards in particular. However, it should be understood by those skilled in the art that the subject matter of the present invention is applicable to other communication systems having similar technical backgrounds and channel configurations without significant modifications departing from the scope of the present invention.

The aspects, features and advantages of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

The embodiments of the present invention relate to a terminal supporting public safety services.

In the following description, the public safety network or public safety LTE (PS-LTE) may mean a network supporting a Push-to-Talk (PTT) service based on enhanced MBMS technology for large capacity group communication. The public safety network or PS-LTE aims to provide communication services for public safety or in disaster situations.

The base station may determine the ability to provide the public safety network service according to its release version.

The terminals may be classified into a terminal capable of receiving the PS-LTE service and a terminal incapable of receiving the PS-LTE service.

The public safety network service of the present invention may mean a service provided through a public safety network based on the eMBMS technology.

In an embodiment of the present invention, a PS-LTE terminal is described as an example of a terminal supporting the public safety network service. However, the present invention is not limited thereto. The PS-LTE terminal can be used with the same meaning as the disaster network terminal. The PS-LTE terminal can be used with the same meaning as the disaster network terminal.

Cell reselection is a process of reselecting the serving cell so that the terminal can be connected to a cell with the best channel state. The network assigns priority to each frequency to control cell reselection of terminals in the idle mode. For example, if a terminal receives priority information for two frequencies f1 and f2 and f1 has a higher priority than f2, the probability that the terminal will remain at f1 is high. Also, although the terminal remains at f2, if the channel state of f2 is not good, it may try to change the frequency to f1. The priority information on the frequency may be broadcast through the SIB, or may be provided to a specific terminal through an RRC connection release message serving as dedicated RRC signaling. Although if the terminal already has priority information on frequencies through the SIB, if terminal-specific priority information is provided through the RRC signaling, the priority information obtained via the SIB may be ignored. The priority information of the frequency may be transmitted through the cellReselectionPriority IE. Inter-RAT frequencies cannot be given the same priority. If the idle state of a terminal is "camped on any cell state", the priority information received through the SIB is applied, and the priority information received through the RRC signaling is not used but stored. The cellReselectionPriority IE is optional and may be not present. That is, priority information on the corresponding frequency is not given. In this case, the terminal may regard the priority of the corresponding frequency as the lowest level.

FIG. 1 illustrates the network architecture of the LTE system for the MBMS service.

In FIG. 1, the mobility management entity (MME) 100 is responsible for controlling the MBMS session, and is connected with the MBMS coordination entity (MCE) 110 through the M3 interface. The MCE 110 manages and allocates radio resources to base stations (enhanced Node B (eNB)) 140 belonging to the MCE, and performs admission control for the MBMS service. The MCE 110 determines the modulation and coding scheme (MCS) for the MBMS service and controls the MBMS session. For managing radio resources, the MCE is a logical node that may be physically separated from the base station, or may be distributed across multiple base stations so that one MCE instance on a base station becomes the master and MCE instances on the other base stations become slaves.

The broadcast/multicast service center (BM-SC) 120 performs authorization verification and service initiation for MBMS bearer services, and performs scheduling and transmission of MBMS content in consideration of the service quality. The BM-SC can autonomously deliver broadcasting content to the LTE network, and can also deliver broadcasting content in cooperation with an external content provider 160. The BM-SC is connected with the MBMS gateway (MBMS-GW) 130 through the SCmb interface for control message transmission and through the SGi-mb interface for content transmission (user traffic). The MBMS-GW 130 performs control (service start and stop) for the MBMS session and delivers content to the base station via IP multicast. The MBMS-GW is connected with the MME through the Sm interface for control message transmission and is connected with the base station through the M1 interface for content transmission.

The base station 140 allocates radio resources and performs synchronized transmission for MBMS services so as to receive information on the radio resources allocated by the MCE and deliver the broadcast service scheduled by the MCE to the terminal (user equipment (UE) or mobile terminal) 150. The base station is connected with the MCE via the M2 interface for control signal transmission. The terminal 150 receives synchronized MBMS data.

Figure 2:
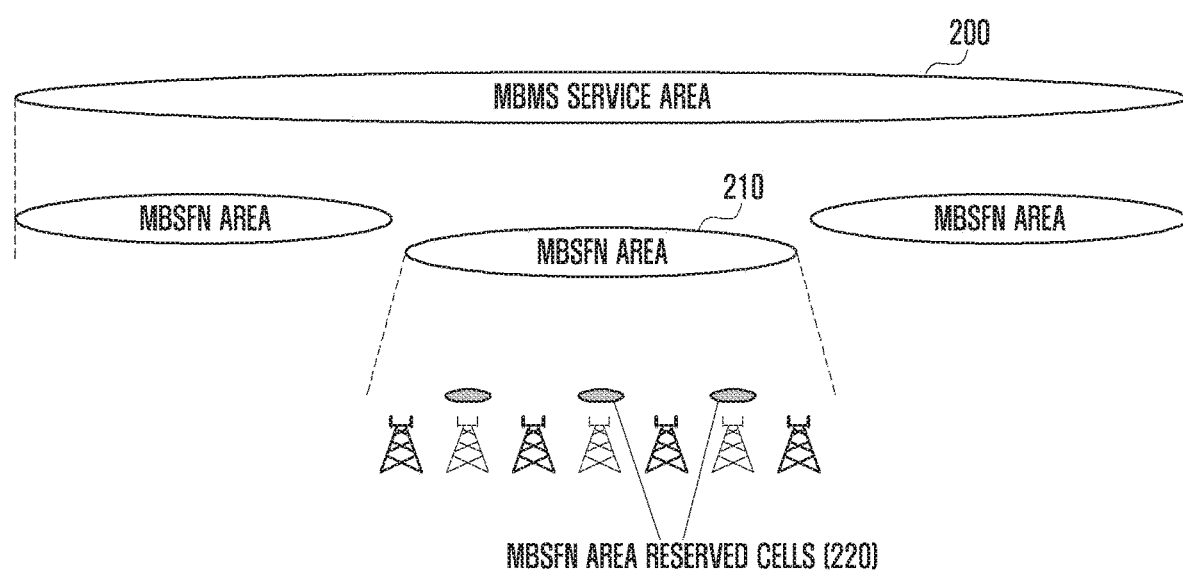
FIG. 2 illustrates an MBMS service area.

FIG. 2 illustrates an MBMS service area.

The MBMS service area 200 is a network area composed of plural base stations capable of performing signal transmission for the MBMS single frequency network (MBSFN) (referred to as MBSFN transmission).

The MBSFN area 210 (or broadcast area) is a network area composed of plural cells integrated for MBSFN transmission, and all MBSFN transmissions of the cells belonging to the MBSFN area are synchronized.

All cells except for MBSFN area reserved cells 220 may be used for MBSFN transmission. The MBSFN area reserved cell 220 is not used for MBSFN transmission, although it can transmit signals for other purposes, but only limited transmission power can be allowed for radio resources allocated to MBSFN transmission.

Figure 3:
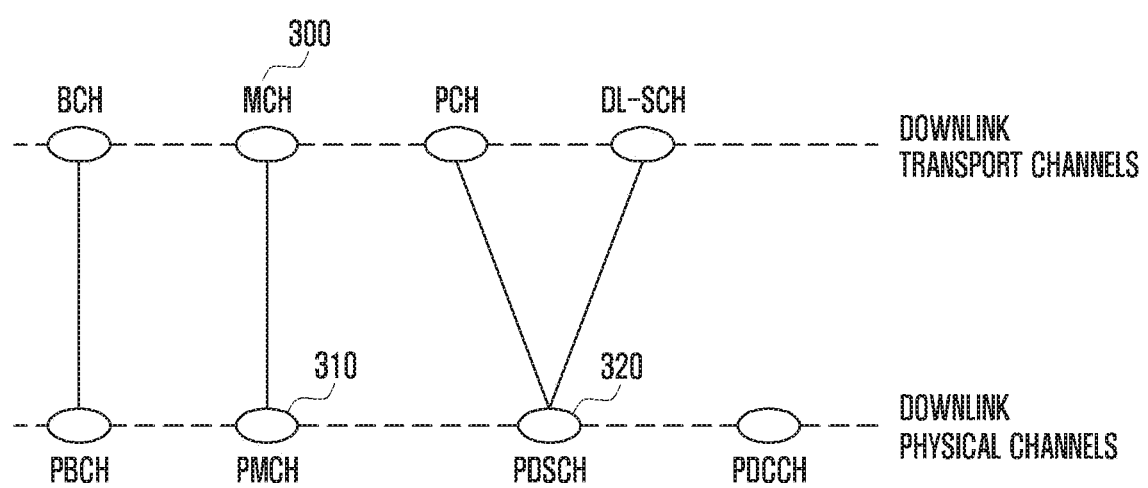
FIG. 3 illustrates a mapping relationship between downlink channels usable for MBSFN transmission.

FIG. 3 illustrates a mapping relationship between downlink channels usable for MBSFN transmission.

As shown in FIG. 3, the multicast channel (MCH) 300 is used as a downlink transport channel between the MAC layer and the physical layer, and the MCH is mapped to the physical multicast channel (PMCH) 310 serving as a downlink physical channel. On the other hand, unicast transmission where data is sent only to a specific terminal is generally performed using the physical downlink shared channel (PDSCH) 320.

The terminal in the idle mode performs the following measurement for cell reselection. The following rules apply to limit measurements of the terminal (refer to 3GPP TS 36.304 for more details).

If $S_{rxlev}$ (cell selection RX level value (dB) given by $Q_{rxlevmeas}-(Q_{rxlevmin}+Q_{rxlevminoffset})-Pcompensation-Qoffset_{temp}$) is greater than $S_{IntmSearchP}$ and $S_{qual}$ (cell selection quality value (dB) given by $Q_{qualmeas}-(Q_{qualmin}+Q_{qualminoffset})-Q_{offsettemp}$) is greater than $S_{IntrasearchQ}$ in the serving cell, intra-frequency measurement may be not performed.

If the above condition is not satisfied, the terminal must perform intra-frequency measurement.

The terminal should perform measurement for E-UTRAN inter-frequencies and inter-RAT frequencies (frequencies of different radio access technologies), which are indicated by system information and for which the terminal has priority information, according to the following rule.

The terminal must perform measurement for the E-UTRAN inter-frequency or inter-RAT frequency having a higher priority than the current frequency.

If the serving cell satisfies Srxlev>$S_{nonIntraSearchP}$ and Squal>$S_{nonIntrasearchQ}$, the terminal may choose not to perform measurement for the E-UTRAN inter-frequency or inter-RAT frequency having a priority lower than or equal to that of the current frequency. Otherwise, the terminal must perform measurement for the E-UTRAN inter-frequency or inter-RAT frequency having a priority lower than or equal to that of the current frequency.

After performing measurement as described above, if threshServingLowQ is provided in SystemInformationBlockType3 and more than 1 second has elapsed since the terminal camped on the current serving cell, the terminal performs cell reselection by selecting the cell meeting the following rule.

If a EUTRAN or UTRAN FDD frequency with a higher priority fulfils Squal>$Thresh_{x, HighQ}$ for a time interval $T_{reselectionRAT}$, or if a UTRAN TDD, GERAN or CDMA2000 frequency with a higher priority fulfils Srxlev>$Thresh_{x, HighP}$ for a time interval $T_{reselectionRAT}$ Otherwise, if a frequency with a higher priority fulfils Srxlev>$Thresh_{x, HighP}$ for a time interval $T_{reselectionRAT}$ and more than 1 second has elapsed since the terminal camped on the current serving cell For E-UTRAN frequencies with the same priority, cell reselection is performed based on the ranking of reference signal received power (RSRP) values for the neighbor cells and serving cell.

For E-UTRAN frequencies or inter-RAT frequencies with a lower priority, the terminal performs cell reselection by selecting the cell meeting the following rule.

If the serving cell fulfils Squal<$Thresh_{Serving, LowQ}$ and a EUTRAN or UTRAN FDD frequency with a lower priority fulfils Squal>$Thresh_{X, LowQ}$ for a time interval $T_{reselectionRAT}$, or if the serving cell fulfils Squal<$Thresh_{Serving, LowQ}$ and a UTRAN TDD, GERAN or CDMA2000 frequency with a lower priority fulfils Srxlev>$Thresh_{X, LowP}$ for a time interval $T_{reselectionRAT}$ Otherwise, if the serving cell fulfils Srxlev<$Thresh_{Serving, LowP}$ and a frequency with a lower priority fulfils Srxlev>$Thresh_{X, LowP}$ for a time interval $T_{reselectionRAT}$ and more than 1 second has elapsed since the terminal camped on the current serving cell This reselection process is performed from higher-priority frequencies to lower-priority frequencies.

Figure 4:
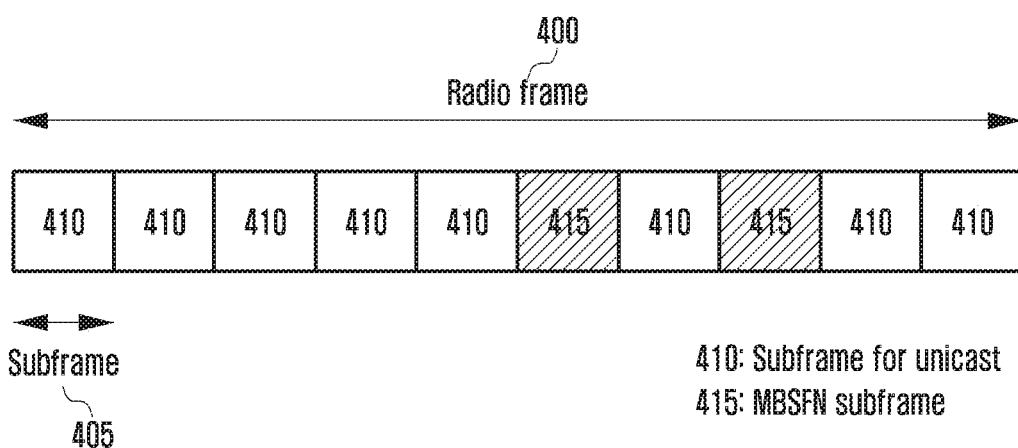
FIG. 4 illustrates the structure of a downlink frame used in the LTE system.

FIG. 4 illustrates the structure of a downlink frame used in the LTE system.

As shown in FIG. 4, the radio frame 400 includes 10 subframes 405. Here, each subframe may be used as a normal subframe 410 for general data transmission and reception, or used as a MBSFN (multimedia broadcast multicast service single frequency network) subframe 415 for broadcasting.

The normal subframe and the MBSFN subframe may differ in terms of the number of OFDM (orthogonal frequency division multiplexing) symbols, the cyclic prefix length, and the structure and number of cell-specific reference signals (CRS).

Meanwhile, in Rel-8 and Rel-9 systems, MBSFN subframes were used only to transmit broadcast or multicast data, etc. With evolution of the system, MBSFN subframes can be used to transmit unicast data since LTE Rel-10, as well as for broadcast or multicast data.

In LTE, to efficiently use the physical downlink shared channel (PDSCH), individual terminals are configured according to the multi-antenna technology and the transmission mode (TM) related to the reference signal (RS).

In current LTE Rel-10, there are TM1 to TM9. Each terminal has one TM for PDSCH transmission. TM8 is newly defined in Rel-9, and TM9 is newly defined in Rel-10.

In particular, TM9 supports single-user multiple-input and multiple-output (SU-MIMO) of a maximum rank of 8. TM9 supports multi-layer transmission. For demodulation, TM9 supports up to eight layers using the Rel-10 demodulation reference signal (DMRS). The Rel-10 DMRS is transmitted as a precoded DMRS, but there is no need to notify the receiving end of the corresponding precoder index.

To support TM9, Rel-10 newly defines Downlink Control Information (DCI) format 2C. In particular, terminals before Rel-10 do not attempt to perform decoding at MBSFN subframes. Hence, requiring all terminals to attempt to perform decoding at MBSFN subframes leads to an upgrade request for the terminals of the previous releases.

Among the TMs described above, TM9 in particular is a transmission mode for maximizing the transmission efficiency using the multi-antenna technology. In the present invention, the base station may configure TM9 for a terminal that needs to increase data throughput by receiving unicast data even at the MBSFN subframe, and it allows only terminals with TM9 configured to receive unicast data in the MBSFN subframe.

In the LTE system, to transmit and receive unicast data, the PDCCH notifies where data transmission or reception actually takes place, and the actual data is transmitted on the PDSCH. Before receiving actual data, the terminal must determine whether there is resource allocation information addressed to it in the PDCCH.

On the other hand, in the MBSFN, resource allocation information is obtained through a more complicated procedure.

First, the base station notifies the terminal of the transmission position of the multicast control channel (MCCH) for each MBSFN area provided by the cell through System Information Block 13 (SIB13) being broadcast information. The MCCH carries resource allocation information for the MBSFN, and the terminal can determine the transmission position of the MBSFN subframe by decoding the MCCH.

As described above, the reason why the MBMS provides resource allocation information through a scheme different from conventional unicast is that it should be possible to provide the MBMS to the terminal in the idle mode. Hence, the transmission position of the control channel MCCH is notified through broadcast information SIB13. The overall process of receiving the MBMS service is described with reference to FIG. 5.

Figure 5:
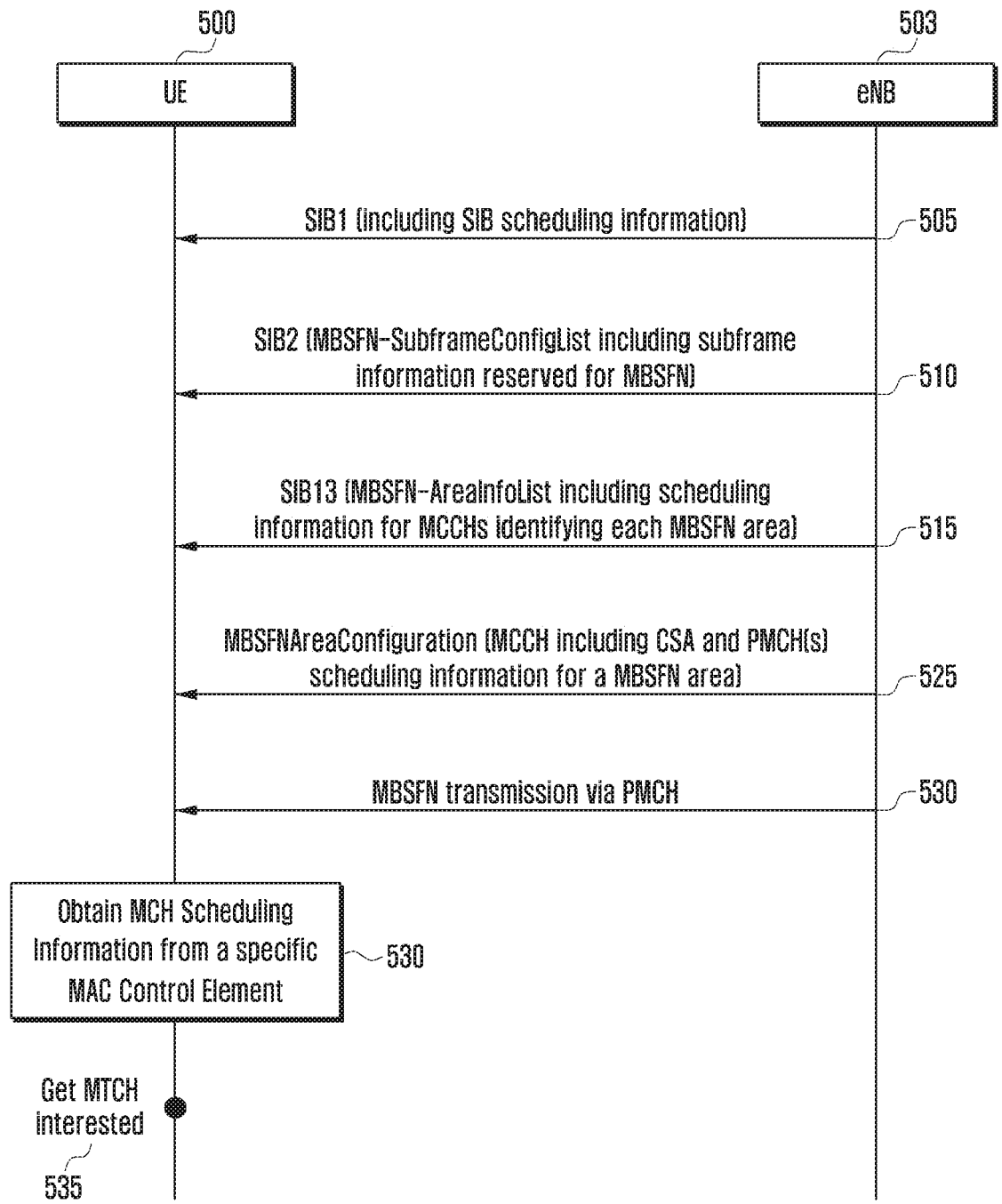
FIG. 5 is a sequence diagram illustrating a procedure for MBSFN reception by the terminal.

FIG. 5 is a sequence diagram illustrating a procedure for MBSFN reception by the terminal.

At step 505, the terminal (UE) 500 receives SIB1 from the base station (eNB) 503. SIB1 includes scheduling information for other SIBs. Hence, SIB1 should be received in advance to receive another SIB.

At step 510, the terminal 500 receives SIB2 from the base station 503. The MBSFN-SubframeConfigList IE of SIB2 indicates the subframes that can be used for MBSFN transmission.

The MBSFN-SubframeConfigList IE includes an MBSFN-SubframeConfig IE, which indicates which subframe of the radio frame can be an MBSFN subframe. The MBSFN-SubframeConfig IE is illustrated in Table 1 below.

TABLE 1

MBSFN-SubframeConfig information element

```
-- ANS1START
MBSFN-SubframeConfig::=        SEQUENCE {
    radioframeAllcationPeriod      ENUMERATED {n1, n2, n4,
                                   n8,n16,n32},
    radioframeAllocationOffset     INTEGER (0..7),
    subframeAllocation             CHOICE {
        oneFrame                       BITSTRING (SIZE(6)),
        fourFrames                     BITSTRING (SIZE(24))
    }
}
-- ASN1STOP
```

Here, radioFrameAllocationPeriod and radioFrameAllocationOffset are used to indicate a radio frame including an MBSFN subframe. The radio frame satisfying the equation "SFN mod radioFrameAllocationPeriod=radioFrameAllocationOffset" includes an MBSFN subframe.

SFN is the system frame number and indicates the radio frame number. The SFN belongs to the range of 0 to 1023 and is repeated.

Here, subframeAllocation indicates which subframe of the radio frame specified by the above equation is an MBSFN subframe.

It can be specified in units of one radio frame or four radio frames. When the one radio frame unit is used, this is indicated by the oneFrame IE. Among total 10 subframes in one radio frame, the MBSFN subframe may exist at $1^{st}$, $2^{nd}$, $3^{rd}$, $6^{th}$, $7^{th}$, and $8^{th}$ subframes. Hence, the oneFrame IE uses 6 bits to indicate the MBSFN subframe among the listed subframes.

When the four radio frame unit is used, this is indicated by the fourFrames IE. To cover the four radio frames, total 24 bits are used to indicate the MBSFN subframe among the listed subframes for each radio frame. Hence, the terminal can accurately identify the subframe that can be an MBSFN subframe based on the MBSFN-SubframeConfigList IE.

If the terminal 500 wishes to receive the MBSFN, at step 515, the terminal 500 receives SIB13 from the base station 505. The MBSFN-AreaInfoList IE of SIB13 includes information on the location where the MCCH is transmitted for each MBSFN area provided by the cell. Using this information, at step 520, the terminal receives the MCCH.

The MBSFN-AreaInfoList IE is illustrated in Table 2 below.

The MCCH is provided for each MBSFN area, and the MBSFN-AreaInfoList IE contains MCCH scheduling information for all MBSFN areas. The MBSFN-AreaInfoList IE may include MCCH scheduling information and other information. Here, mbsfn-AreaId indicates the MBSFN area ID; non-MBSFNRegionLength indicates the number of symbols corresponding to the non-MBSFN area among the symbols in the MBFSN subframe, and the symbol is located at the beginning of the subframe; notificationIndicator is used to indicate the PDCCH bit notifying the terminal of a change in the MCCH information; the mcch-Config IE contains MCCH scheduling information; mcch-RepetitionPeriod and mcch-Offset are used to indicate the location of the frame including the MCCH; mcch-ModificationPeriod is the transmission period of the MCCH; sf-AllocInfo indicates the position of the subframe including the MCCH in the frame including the MCCH; and signalingMCS indicates the modulation and coding scheme (MCS) applied to the subframe indicated by sf-AllocInfo and (P)MCH.

TABLE 2

MBSFN-AreaInfoList information element

```
-- ASN1START
MBSFN-AreaInfoList-r9 ::=      SEQUENCE (SIZE(1..maxMBSFN-Area)) OF MBSFN-AreaInfo-
                               r9
MBSFN-AreaInfo-r9 ::=          SEQUENCE {
    mbsfn-AreaId-r9                INTEGER (0..255),
    non-MBSFNregionLength          ENUMERATED {s1, s2},
    notificationIndicator-r9       INTEGER (0..7),
    mcch-Config-r9                 SEQUENCE {
        mcch-RepetitionPeriod-r9       ENUMERATED {rf32,rf64,rf128,rf256},
        mcch-Offset-r9                 INTEGER (0..10),
        mcch-ModificationPeriod-r9     ENUMERATED {rf512,rf1024},
        sf-AllocInfo-r9                BIT STRING (SIZE(6)),
        signallingMCS-r9               ENUMERATED {n2, n7, n13,n19}
    },
    ...
}
```

The MBSFNAreaConfiguration IE of the MCCH indicates the location of the resource used for MBSFN transmission. Using this information, at step 525, the terminal receives the MBSFN subframe. Here, commonSF-Alloc indicates the subframes assigned to the MBSFN area; and commonSF-AllocPeriod indicates the period in which the subframes indicated by commonSF-Alloc are repeated.

The pmch-InfoList IE contains all the PMCH configuration information of one MBSFN area.

TABLE 3

MBSFNAreaConfiguration message

```
-- ASN1START
MBSFNAreaConfiguration-r9 ::=  SEQUENCE {
    commonSF-Alloc-r9              CommonSF-AllocPatternList-r9,
```

TABLE 3-continued

| MBSFNAreaConfiguration message | | |
|---|---|---|
| commonSF-AllocPeriod-r9 | ENUMERATED { rf4,rf8,rf16,rf32,rf64,rf128,rf256}, | |
| pmch-InfoList-r9 | PMCH-InfoList-r9, | |
| nonCriticalExtension | MBSFNAreaConfiguration-v930-IEs | OPTIONAL |
| } | | |
| MBSFNAreaConfiguration-v930-IEs::=SEQUENCE { | | |
| lateNonCriticalExtension | OCTET STRING | OPTIONAL, -- Need OP |
| nonCriticalExtension | SEQUENCE { } | OPTIONAL -- Need OP |
| } | | |
| CommonSF-AllocPatternList-r9 ::= | SEQUENCE (SIZE (1..maxMBSFN-Allocations)) OF MBSFN-SubframeConfig | |
| -- ASN1STOP | | |

At step 530, the terminal identifies the location of the MBSFN subframe at which the desired MTCH is transmitted from the MCH scheduling information MAC CE, which is one of MAC control elements (CE) of the received MAC PDU. At step 535, the terminal decodes the desired MTCH using the MCH scheduling information.

Figure 6:
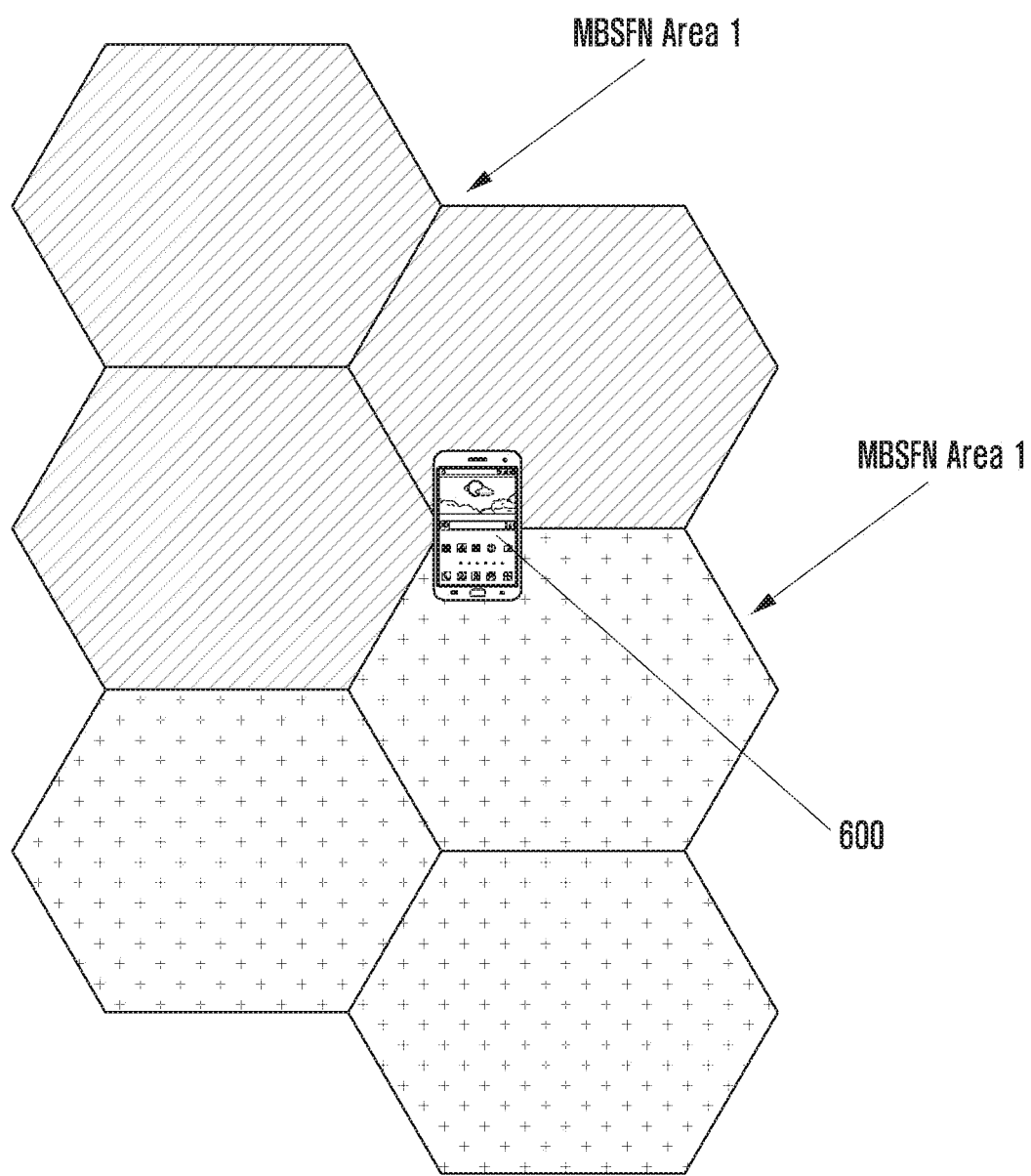
FIG. 6 depicts a problem that may occur when the terminal is moved between cells.

FIG. 6 depicts a problem that may occur when the terminal is moved between cells.

In FIG. 6, when the terminal 600 receiving the (e)MBMS service is moved between cells (cell change), it may be unable to decode data received from the PMCH channel and has to buffer the data before receiving MBSFN area information (broadcast area information) included in SIB 13 (system information block 13) message defined in the standard. That is, when the terminal is moved to another cell, playback of the image may be delayed until the SIB 13 message is received and whether broadcast area information of the cell after movement is the same as that before movement is determined.

In addition, when the terminal in the idle state is moved to another cell, the number of cell reselections is increased, which may increase the possibility of buffering.

When the same threshold of the cell reselection parameter related to the idle state is applied to the regular terminal and the PS-LTE terminal, the specificity in cell reselection of the PS-LTE terminal cannot be reflected.

To solve the above problem, the present invention provides a method and apparatus for minimizing the delay in decoding broadcast data when the terminal is moved between cells.

More particularly, the present invention discloses a method that, when a PS-LTE terminal in the idle state is moved to another cell, optimizes the cell reselection configuration value or applies a cell reselection configuration value different from that of a regular terminal to the PS-LTE terminal so that cell reselection does not occur frequently.

In addition, the present invention discloses a method that enables the PS-LTE terminal to autonomously adjust the cell reselection configuration value so that cell reselection does not occur frequently when it is moved between cells.

Next, a description is given of the first embodiment of the present invention.

In the first embodiment of the present invention, the base station can adjust the value of the hysteresis information and the offset information, which are used to reduce the ping-pong phenomenon, among the parameters used when the terminal performs cell reselection. The base station may adjust the value of the hysteresis information and the offset information used for reducing the ping-pong phenomenon when the PS-LTE terminal performs cell reselection.

More specifically, the hysteresis information may be the Q-Hyst parameter broadcast through SIB3. In addition, the offset information may be the q-OffsetCell parameter broadcasted through SIB4.

In the first embodiment, the base station may reduce the number of cell reselections of the terminal by adjusting the above parameter values so that the terminal remains in the serving cell as long as possible. On the other hand, adjusting the above parameter values for cell reselection may affect paging performance. Hence, the base station adjusts the above parameter values within a range that does not affect paging performance.

According to the first embodiment of the present invention described above, the frequency of cell reselections of the terminal is reduced, and the buffering problem can be alleviated.

Next, a description is given of the second embodiment of the present invention.

In the second embodiment of the present invention, the base station subdivides the hysteresis information broadcast through SIB3 into first hysteresis information for the first type terminal and second hysteresis information for the second type terminal.

Here, the first type terminal indicates a terminal that does not support the public safety network service, and the first hysteresis information is a parameter used when a terminal that does not support the public safety network service performs cell reselection in the idle state.

The second type terminal indicates a terminal that supports the public safety network service, and the second hysteresis information is a parameter used when a terminal that supports the public safety network service performs cell reselection in the idle state.

The terminal in the idle state monitors whether there is a neighbor cell having a received signal strength greater than that of the current serving cell and, if there is a neighbor cell having a larger received signal strength, selects the neighbor cell as the serving cell. This is called cell reselection.

The terminal measures the ranking score for the serving cell and at least one neighbor cell through the following equation.

$$R_s = Q_{meas,s} + Q_{hyst}$$

$$R_n = Q_{meas,n} - Q_{offset,s,n} \qquad \text{[Equation 1]}$$

Here, $R_s$ is the ranking score for the serving cell, and $R_n$ is the ranking score for one of the neighbor cells. $Q_{meas,s}$ is the reception power for the signal of the serving cell received through the receiver of the terminal, and $Q_{meas,n}$ is the reception power for the signal of the neighbor cell received through the receiver of the terminal.

As can be seen from Equation 1, when the ranking score for the serving cell is measured, the hysteresis parameter is considered to prevent a ping-pong phenomenon from occurring due to erroneous cell reselection of the terminal. Specifically, only when a neighboring cell having a large received signal strength exceeding the sum of the measurement result from the serving cell and the hysteresis parameter value is found, the terminal performs cell reselection to the neighbor cell.

As can also be seen from Equation 1, when the ranking score for a neighbor cell is measured, the offset parameter is considered to prevent a ping-pong phenomenon from occurring due to erroneous cell reselection of the terminal.

In the second embodiment, the base station subdivides the hysteresis information into first hysteresis information for the first type terminal not supporting the public safety network service and second hysteresis information for the second type terminal supporting the public safety network service.

Accordingly, the terminal performs cell reselection based on different pieces of the hysteresis information depending on whether the public safety network service is supported. For example, the terminal supporting the public safety network service may perform cell reselection based on the second hysteresis information having a relatively larger value, thereby reducing the number of cell reselections.

To this end, the contents of SIB3 broadcasted by the base station can be changed as shown in Table 4 below.

At step 730, the base station may generate the SIB including the first hysteresis information and the second hysteresis information. In one embodiment, the SIB may include SIB3.

At step 740, the base station may broadcast the generated SIB.

Figure 8:
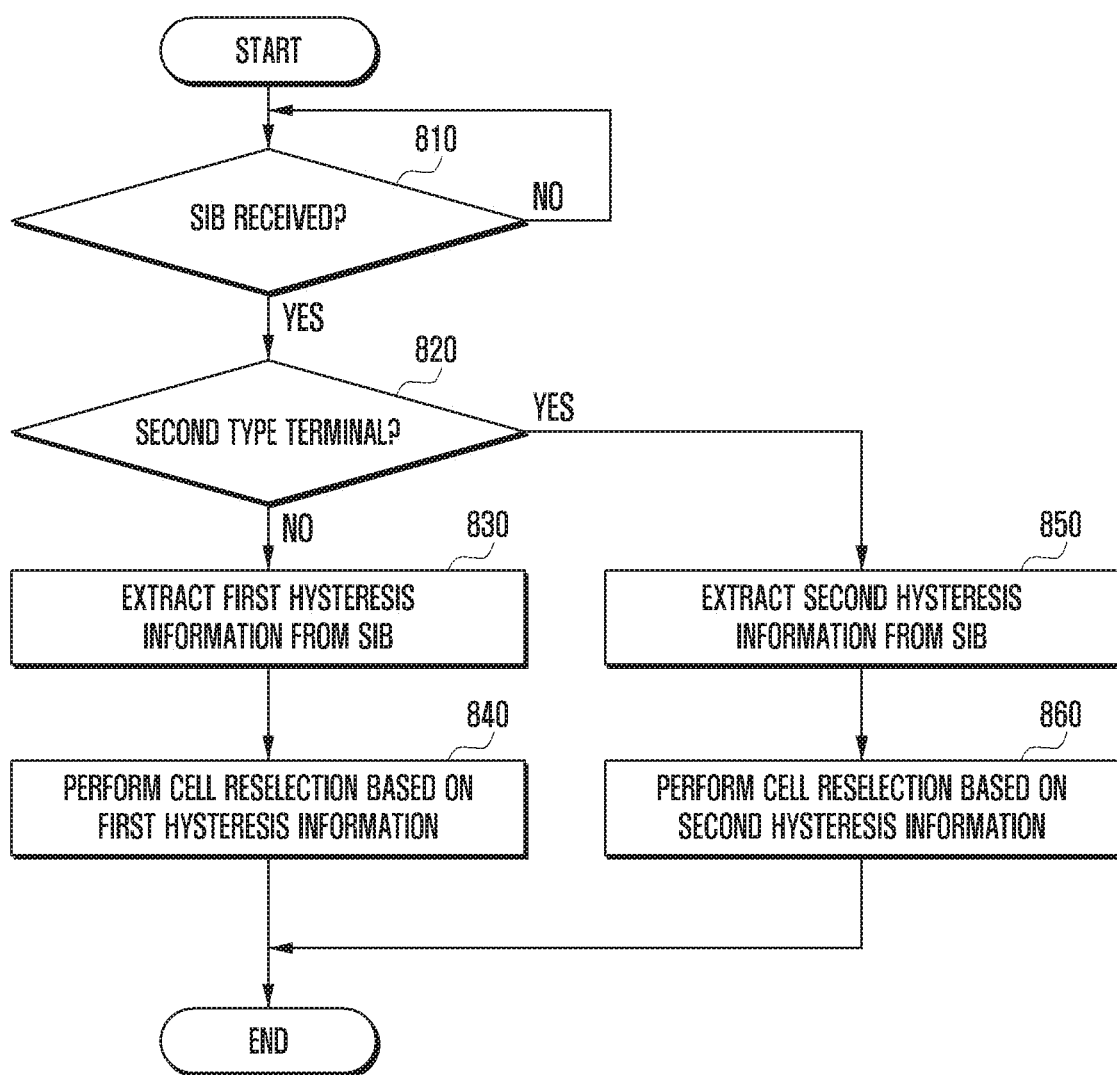
FIG. 8 illustrates operations of the terminal according to the second embodiment of the present invention.

FIG. 8 illustrates operations of the terminal according to the second embodiment of the present invention.

At step 810, the terminal may determine whether the SIB including hysteresis information is received from the base station. Here, the SIB may include SIB3.

At step 820, the terminal determines whether it is a first type terminal or a second type terminal. According to the type of the terminal, the procedure proceeds to step 830 or to step 850. According to the type of the terminal, the terminal can determine whether to apply the information for the first type terminal or the information for the second type terminal among the information included in the system information block. Meanwhile, step 820 may be omitted. Since the terminal already knows its type, step 820 may be omitted. In this case, if the terminal is a first type terminal, it may proceed to step 830 after receiving the SIB at step 810. If the terminal is a second type terminal, it may proceed to step 850 after receiving the SIB at step 810.

If the terminal is a first type terminal, the procedure proceeds to step 830 at which the terminal extracts the first hysteresis information from the received SIB. At step 840,

TABLE 4

| | |
|---|---|
| SystemInformationBlockType3 ::= | SEQUENCE { |
| cellReselectionInfoCommon | SEQUENCE { |
| q-Hyst | ENUMERATED { |
| | dB0, dB1, dB2, dB3, dB4, dB5, dB6, dB8, dB10, |
| | dB12, dB14, dB16, dB18, dB20, dB22, dB24}, |
| q-Hyst-PS | ENUMERATED { |
| | dB0, dB1, dB2, dB3, dB4, dB5, dB6, dB8, dB10, |
| | dB12, dB14, dB16, dB18, dB20, dB22, dB24}, |
| speedStateReselectionPars | SEQUENCE { |
| mobilityStateParameters | MobilityStateParameters, |
| q-HystSF | SEQUENCE { |
| sf-Medium | ENUMERATED { |
| | dB-6, dB-4, dB-2, dB0}, |
| sf-High | ENUMERATED { |
| | dB-6, dB-4, dB-2, dB0} |
| } | |
| } | OPTIONAL     -- Need |
| OP | |
| }, | |

In Table 4, q-Hyst indicates the first hysteresis information, and q-Hyst-PS indicates the second hysteresis information.

The operations of the base station and the terminal according to the second embodiment of the present invention are described with reference to FIGS. 7 and 8.

Figure 7:
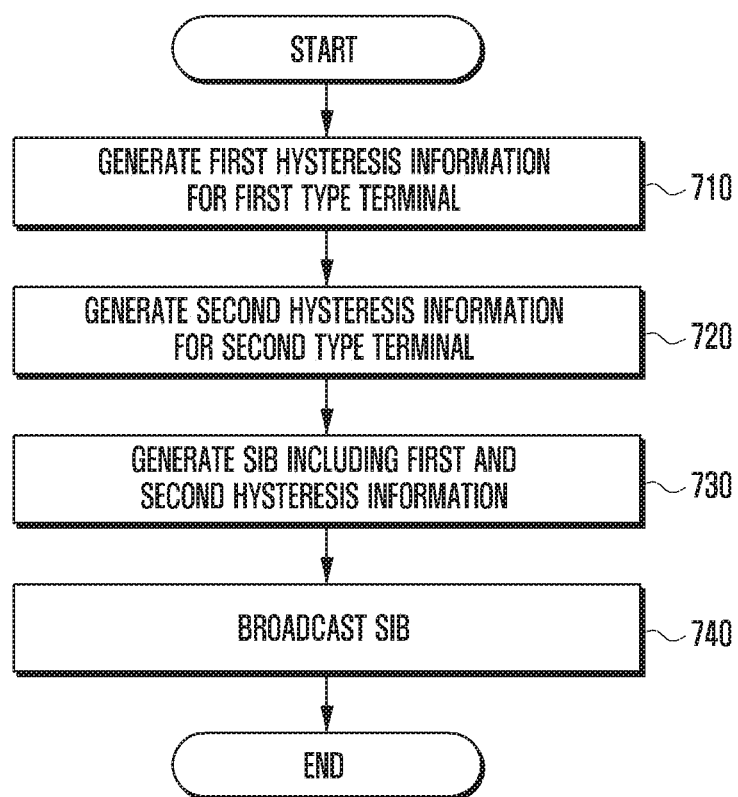
FIG. 7 illustrates operations of the base station according to a second embodiment of the present invention.

FIG. 7 illustrates operations of the base station according to the second embodiment of the present invention.

At step 710, the base station may generate first hysteresis information for the first type terminal. Here, the first type terminal may include a terminal that does not support the public safety network service.

At step 720, the base station may generate second hysteresis information for the second type terminal. Here, the second type terminal may include a terminal supporting the public safety network service.

In a preferred embodiment, the value of the second hysteresis information may be greater than that of the first hysteresis information by a preset reference value.

the terminal performs cell reselection based on the extracted first hysteresis information. In the idle state, the terminal may perform cell reselection.

If the terminal is a second type terminal, the procedure proceeds to step 850 at which the terminal extracts the second hysteresis information from the received SIB. At step 860, the terminal performs cell reselection based on the extracted second hysteresis information.

Next, a description is given of the third embodiment of the present invention.

In the third embodiment of the present invention, the base station subdivides the threshold information for cell reselection broadcast via the SIB (e.g., at least one of SIB3, SIB4 and SIB5) into first threshold information for the first type terminal and second threshold information for the second type terminal.

Here, the first type terminal may include a terminal that does not support the public safety network service, and the first threshold information is a parameter used when a terminal that does not support the public safety network service performs cell reselection in the idle state.

The second type terminal may include a terminal that supports the public safety network service, and the second threshold information is a parameter used when a terminal that supports the public safety network service performs cell reselection in the idle state.

The terminal in the idle state monitors whether there is a neighbor cell having a received signal strength greater than the cell reselection threshold information and, if there is a neighbor cell having a larger received signal strength, selects the neighbor cell as the serving cell.

As described above, the terminal considers cell threshold information for cell reselection. This is because the terminal is forced to select a cell that can provide a radio environment better than a preset reference as the serving cell.

In the third embodiment of the present invention, the cell reselection threshold information is divided into first threshold information for the terminal that does not support the public safety network service and second threshold information for the terminal that supports the public safety network service.

Accordingly, the terminal performs cell reselection based on different pieces of the cell reselection threshold information depending on whether the public safety network service is supported. For example, the terminal supporting the public safety network service may perform cell reselection based on the second threshold information having a relatively larger value, thereby reducing the number of cell reselections. When the threshold value is large, cell reselection occurs only when the measured value of the received signal of the neighbor cell is larger than the threshold value, so that the number of cell reselections can be reduced.

To this end, the contents of SIB3, SIB4 and SIB5 broadcast by the base station can be changed as shown in Table 5 below.

At step 930, the base station may generate the SIB including the first threshold information and the second threshold information. In one embodiment, the SIB may include at least one of SIB3, SIB4, and SIB5.

At step 940, the base station may broadcast the generated SIB.

Figure 10:
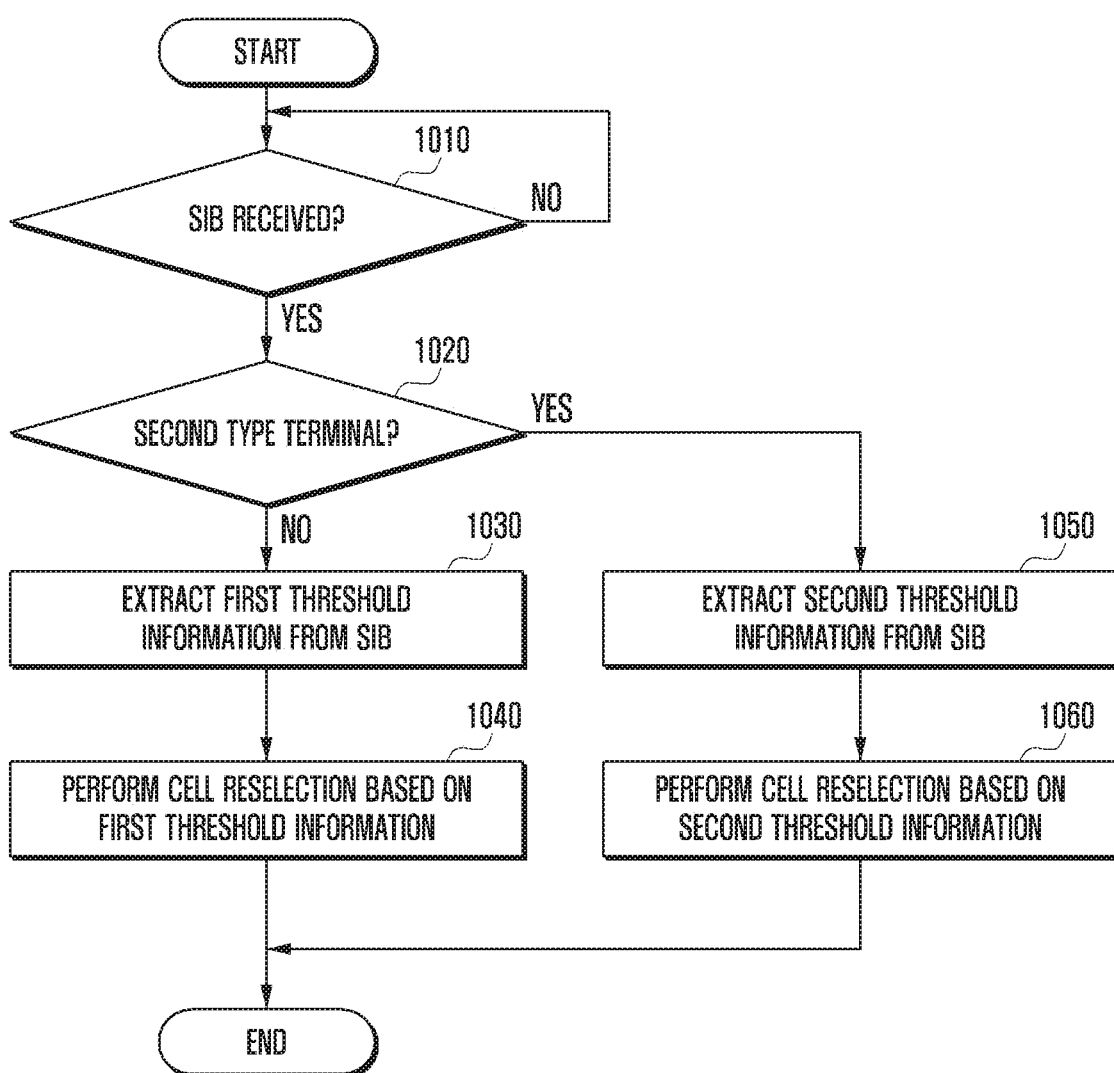
FIG. 10 illustrates operations of the terminal according to the third embodiment of the present invention.

FIG. 10 illustrates operations of the terminal according to the third embodiment of the present invention.

At step 1010, the terminal may determine whether the SIB including cell reselection threshold information is received from the base station. Here, the SIB may include at least one of SIB3, SIB4, and SIB5.

At step 1020, the terminal determines whether it is a first type terminal or a second type terminal. According to the type of the terminal, the procedure proceeds to step 1030 or to step 1050. According to the type of the terminal, the terminal can determine whether to apply the information for the first type terminal or the information for the second type terminal among the information included in the system information block. Meanwhile, step 1020 may be omitted. Since the terminal already knows its type, step 1020 may be omitted. In this case, if the terminal is a first type terminal, it may proceed to step 1030 after receiving the SIB at step 1010. If the terminal is a second type terminal, it may proceed to step 1050 after receiving the SIB at step 1010.

If the terminal is a first type terminal, the procedure proceeds to step 1030 at which the terminal extracts the first threshold information from the received SIB. At step 1040, the terminal performs cell reselection based on the extracted first threshold information. In the idle state, the terminal may perform cell reselection.

If the terminal is a second type terminal, the procedure proceeds to step 1050 at which the terminal extracts the second threshold information from the received SIB. At step 1060, the terminal performs cell reselection based on the extracted second threshold information.

TABLE 5

| SystemInformationBlockType3 ::= | SEQUENCE { | | |
|---|---|---|---|
| cellReselectionServingFreqInfo | SEQUENCE { | | |
| s-Non-IntraSearch | ReselectionThreshold | OPTIONAL, | -- Need OP |
| s-Non-IntraSearch-PS | ReselectionThreshold | OPTIONAL, | -- Need OP |
| threshServingLow | ReselectionThreshold, | | |
| cellReselectionPriority | CellReselectionPriority | | |
| }, | | | |

In Table 5, s-NonIntraSearch indicates the first threshold information, and s-NonIntraSearch-PS indicates the second threshold information.

Figure 9:
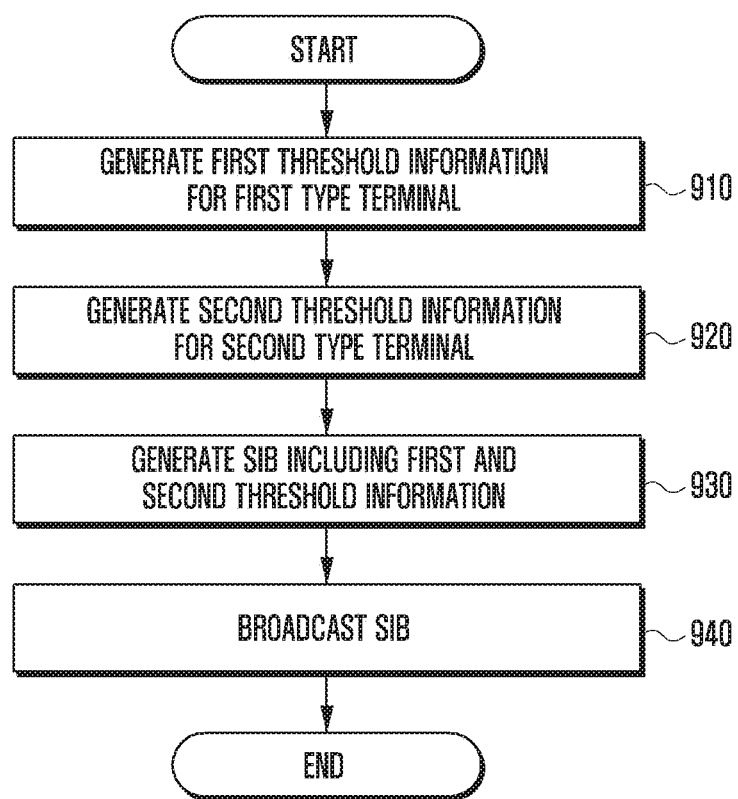
FIG. 9 illustrates operations of the base station according to a third embodiment of the present invention.

The third embodiment of the present invention can be applied to the operation of the base station and the terminal as shown in FIGS. 9 and 10.

FIG. 9 illustrates operations of the base station according to the third embodiment of the present invention.

At step 910, the base station may generate first threshold information for the first type terminal. Here, the first type terminal may include a terminal that does not support the public safety network service.

At step 920, the base station may generate second threshold information for the second type terminal. Here, the second type terminal may include a terminal supporting the public safety network service.

In a preferred embodiment, the value of the second threshold information may be greater than that of the first threshold information by a preset reference value.

The second embodiment and the third embodiment are applicable at the same time. That is, the base station may transmit the SIB including the first hysteresis information, the second hysteresis information, the first threshold information, and the second threshold information. Upon reception of the SIB including the first hysteresis information, the second hysteresis information, the first threshold information, and the second threshold information, the terminal may perform cell reselection according to its type.

Next, a description is given of the fourth embodiment of the present invention.

In the fourth embodiment of the present invention, the terminal supporting the public safety network service may perform cell reselection by using separate offset information in addition to hysteresis information or cell reselection threshold information included in the SIB broadcast by the base station.

When the terminal performs cell reselection using the result of adding the value of the hysteresis information included in the SIB and the value of the offset information, as can be seen from Equation 1, the ranking score for the serving cell becomes high. Hence, when the terminal receives the MBMS data, the frequency of cell reselections can be reduced.

Figure 11:
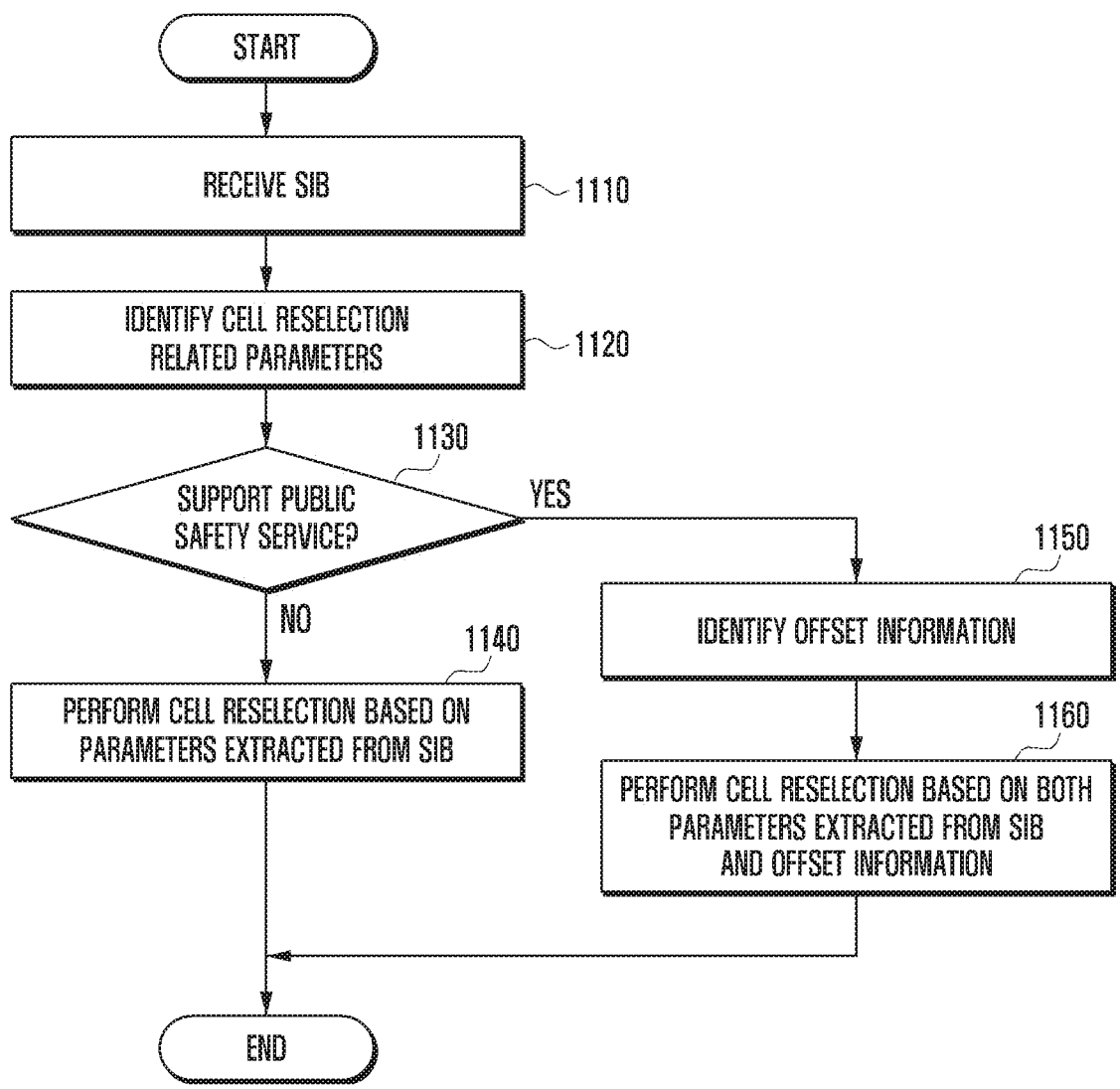
FIG. 11 illustrates operations of the terminal according to a fourth embodiment of the present invention.

A detailed description is given of the fourth embodiment of the present invention with reference to FIG. 11.

FIG. 11 illustrates operations of the terminal according to the fourth embodiment of the present invention.

At step 1110, the terminal may receive the SIB from the base station. Here, the SIB may include SIB3.

When the terminal achieves synchronization with the base station, it can receive the master information block through the physical broadcast channel (PBCH) and obtain SIB scheduling information. Thereby, the terminal can receive the SIB.

At step 1120, the terminal can identify the cell reselection related parameters in received SIB3. The cell reselection related parameters may include at least one of the hysteresis information (Qhyst) and the cell reselection threshold information.

Thereafter, the terminal may enter the idle state at a specific time. The terminal may determine whether there is a need to perform cell reselection. According to the type of the terminal, the procedure proceeds to step 1140 or to step 1150.

If the terminal does not support the public safety network service, the procedure proceeds to step 1140 at which the terminal may perform cell reselection based on the parameter identified from the SIB (e.g., hysteresis information).

If the terminal supports the public safety network service, the procedure proceeds to step 1150 at which the terminal may identify the offset information. The offset information may be a value preset in the terminal. In one embodiment, the base station may deliver the offset information to the terminal through a separate signaling or physical channel.

After identifying the offset information, at step 1160, the terminal may perform cell reselection based on the hysteresis information identified from the SIB and the offset information.

Figure 12:
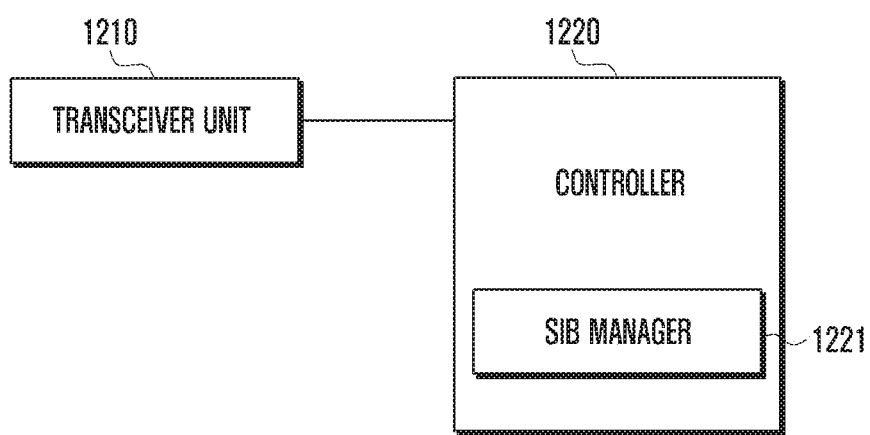
FIG. 12 is a block diagram of a base station according to an embodiment of the present invention.

FIG. 12 is a block diagram of a base station according to an embodiment of the present invention. As shown in FIG. 12, the base station of the present invention may include a transceiver unit 1210 and a controller 1220.

The transceiver unit 1210 may provide a means for transmitting and receiving signals to and from the terminal or the core node of the wireless communication system. For example, when the base station communicates with the terminal, the transceiver unit 1210 forms a radio channel between the base station and the terminal for transmitting and receiving a signal. When the base station communicates with the core node, the transceiver unit 1210 provides a wired interface for transmitting and receiving a signal.

The controller 1220 can control the signal flow between individual blocks so that the base station can perform operations according to an embodiment of the present invention. In one embodiment, the controller 1220 may include a SIB manager 1221.

The SIB manager 1221 may generate a system information block that includes first hysteresis information and/or first threshold information for the first type terminal, and second hysteresis information and/or second threshold information for the second type terminal. The SIB manager 1221 may control broadcasting the generated system information block.

Here, the first type terminal may include a terminal that does not support the public safety network service, and the second type terminal may include a terminal that supports the public safety network service. The system information block may include SIB3.

The first hysteresis information and the first threshold information may be used by a first type terminal for cell reselection, and the second hysteresis information and the second threshold information may be used by a second type terminal for cell reselection.

In the above description, the controller 1220 and the SIB manager 1221 are described as being separate blocks and performing different functions, but the present invention is not limited thereto. For example, the controller 1220 may directly perform the function of the SIB manager 1221. The controller 1220 may control the base station to operate according to the corresponding description of FIGS. 1 to 11 as well as the description of FIG. 12.

Figure 13:
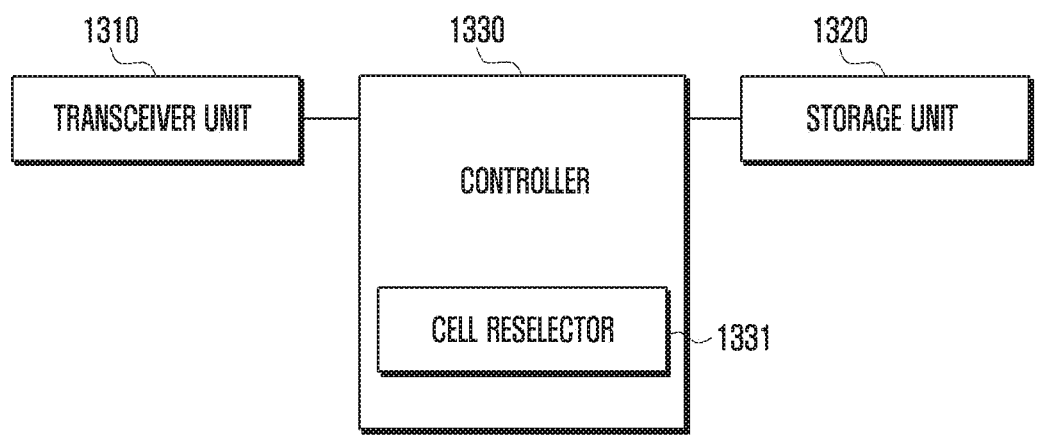
FIG. 13 is a block diagram of a terminal according to an embodiment of the present invention.

FIG. 13 is a block diagram of a terminal according to an embodiment of the present invention. As shown in FIG. 13, the terminal of the present invention may include a transceiver unit 1310, a storage unit 1320, and a controller 1330.

The transceiver unit 1310 establishes a radio channel with the base station to transmit and receive a signal. In one embodiment, the transceiver unit 1310 may receive a system information block from the base station and forward it to the controller 1330.

The storage unit 1320 may store software and programs necessary for the terminal to operate. In one embodiment, the storage unit 1320 may store offset information necessary for the terminal to perform cell reselection.

The controller 1330 may control the signal flow between individual blocks so that the terminal can perform operations according to an embodiment of the present invention. In one embodiment, the controller 1330 may include a cell reselector 1331.

The cell reselector 1331 may control receiving a system information block from the base station and applying cell reselection information according to the type of the terminal. The cell reselector 1331 may control cell reselection based on the system information block and the type.

Specifically, if the terminal does not support the public safety network service, the cell reselector 1331 may control performing cell reselection based on the first hysteresis information and/or the first threshold information for the first type included in the system information block. If the terminal supports the public safety network service, the cell reselector 1331 may control performing cell reselection based on the second hysteresis information and/or the second threshold information for the second type included in the system information block.

In one embodiment, if the terminal supports the public safety network service, the cell reselector 1331 may control checking preset offset information and performing cell reselection based on the hysteresis information included in the system information block and the offset information.

Here, the system information block (SIB) may include SIB3.

In the above description, the controller 1330 and the cell reselector 1331 are described as being separate blocks and performing different functions, but the present invention is not limited thereto. For example, the controller 1330 may directly perform the function of the cell reselector 1331. The controller 1330 may control the terminal to operate according to the corresponding description of FIGS. 1 to 11 as well as the description of FIG. 13.

According to the present invention, when the terminal supporting the public safety network service is moved between cells, cell reselection does not frequently occur, so that the terminal can continuously receive data for the public safety network service without interruption.

Hereinabove, various embodiments of the present invention have been shown and described for the purpose of illustration without limiting the subject matter of the present invention. It should be understood by those skilled in the art that many variations and modifications of the method and apparatus described herein will still fall within the spirit and scope of the present invention as defined in the appended claims and their equivalents.

The invention claimed is:

1. A method of information transmission for a base station in a wireless communication system, the method comprising:
   generating a system information block (SIB) including first hysteresis information for a cell reselection of a first type terminal and second hysteresis information for the cell reselection of a second type terminal; and
   transmitting the generated SIB including both the first hysteresis information and the second hysteresis information,
   wherein the first type terminal corresponds to a terminal not supporting a public safety network service and performing cell reselection when a sum of a serving cell signal strength and a value corresponding to the first hysteresis information is larger than a rank value of a neighbor cell,
   wherein the second type terminal corresponds to a terminal supporting the public safety network service and performing cell reselection when a sum of the serving cell signal strength and a value corresponding to the second hysteresis information is larger than the rank value of the neighbor cell, and
   wherein the second value corresponding to the second hysteresis information is larger than the first value corresponding to the first hysteresis information to decrease a number of cell reselections of the second type terminal relative to the first type terminal.

2. The method of claim 1,
   wherein the SIB further includes first threshold information for the first type terminal and second threshold information for the second type terminal, and
   wherein each threshold information is a criterion for a received signal strength used in cell reselection.

3. A base station in a wireless communication system, comprising:
   a transceiver; and
   at least one processor configured to control:
   generating a system information block (SIB) including first hysteresis information for a cell reselection of a first type terminal and second hysteresis information for the cell reselection of a second type terminal, and
   transmitting the generated SIB including both the first hysteresis information and the second hysteresis information,
   wherein the first type terminal corresponds to a terminal not supporting a public safety network service and performing cell reselection when a sum of a serving cell signal strength and a value corresponding to the first hysteresis information is larger than a rank value of a neighbor cell,
   wherein the second type terminal corresponds to a terminal supporting the public safety network service and performing cell reselection when a sum of the serving cell signal strength and a value corresponding to the second hysteresis information is larger than the rank value of the neighbor cell, and
   wherein the second value corresponding to the second hysteresis information is larger than the first value corresponding to the first hysteresis information to decrease a number of cell reselections of the second type terminal relative to the first type terminal.

4. The base station of claim 3,
   wherein the SIB includes SIB3.

5. The base station of claim 3,
   wherein the SIB includes first threshold information for the first type terminal and second threshold information for the second type terminal, and
   wherein each threshold information is a criterion for a received signal strength used in cell reselection.

6. A method of performing cell reselection for a terminal in a wireless communication system, the method comprising:
   receiving a system information block (SIB) including both first hysteresis information for a cell reselection of a first type terminal and second hysteresis information for the cell reselection of a second type terminal from a base station;
   determining at least one piece of the hysteresis information among the hysteresis information to be applied for the cell reselection according to a type of the terminal; and
   performing the cell reselection based on the SIB and the determination result,
   wherein the first type terminal corresponds to a terminal not supporting a public safety network service and performing cell reselection when a sum of a serving cell signal strength and a value corresponding to the first hysteresis information is larger than a rank value of a neighbor cell,
   wherein the second type terminal corresponds to a terminal supporting the public safety network service and performing cell reselection when a sum of the serving cell signal strength and a value corresponding to the second hysteresis information is larger than the rank value of the neighbor cell, and
   wherein the second value corresponding to the second hysteresis information is larger than the first value corresponding to the first hysteresis information to decrease a number of cell reselections of the second type terminal relative to the first type terminal.

7. The method of claim 6,
   wherein the cell reselection is performed based on either the first hysteresis information or the second hysteresis information according to the type of the terminal.

8. The method of claim 6,
   wherein the SIB includes first threshold information for the first type terminal and second threshold information for the second type terminal,
   wherein each threshold information is a criterion for a received signal strength used in cell reselection, and
   wherein the cell reselection is performed based on either the first threshold information or the second threshold information according to the type of the terminal.

9. A terminal in a wireless communication system, comprising:
   a transceiver, and
   at least one processor configured to control:
   receiving a system information block (SIB) including both first hysteresis information for a cell reselection of a first type terminal and second hysteresis information for the cell reselection of a second type terminal from a base station, determining at least one piece of the hysteresis information among the hysteresis information to be applied for the cell reselection according to a type of the terminal, and performing the cell reselection based on the SIB and the determination result, wherein the first type terminal corresponds to a terminal not supporting a public safety network service and performing cell reselection when a sum of a serving cell signal strength and a value corresponding to the first hysteresis information is larger than a rank value of a neighbor cell, wherein the second type terminal corresponds to a terminal supporting the public safety network service and performing cell reselection when a sum of the serving cell signal strength and a value corresponding to the second hysteresis information is larger than the rank value of the neighbor cell, and wherein the second value corresponding to the second hysteresis information is larger than the first value corresponding to the first hysteresis information to decrease a number of cell reselections of the second type terminal relative to the first type terminal.

10. The terminal of claim 9, wherein the at least one processor is further configured to control the cell reselection based on either the first hysteresis information or the second hysteresis information according to the type of the terminal.

11. The terminal of claim 9, wherein the SIB includes first threshold information for the first type terminal and second threshold information for the second type terminal, wherein each threshold information is a criterion for a received signal strength used in cell reselection, and wherein the at least one processor is further configured to control the cell reselection based on either the first threshold information or the second threshold information according to the type of the terminal.

12. The terminal of claim 9, wherein the SIB includes SIB3.

13. The terminal of claim 9, wherein, in case that the terminal is the second type terminal, the at least one processor is further configured to control:

identifying offset information for delaying the cell reselection, and performing the cell reselection based on the second hysteresis information included in the system information block and the offset information.

* * * * *